United States Patent
Green (10) Patent No.: US 8,108,890 B2
(45) Date of Patent: Jan. 31, 2012

(54) LOCALISED MENUS

(76) Inventor: Stuart A. Green, Sheffield (GB)

( * ) Notice: Subject to any disclaimer, the term of this patent is extended or adjusted under 35 U.S.C. 154(b) by 1149 days.

(21) Appl. No.: 10/827,902

(22) Filed: Apr. 20, 2004

(65) Prior Publication Data
US 2005/0235317 A1    Oct. 20, 2005

(51) Int. Cl.
*G06F 3/048* (2006.01)
*G06F 3/00* (2006.01)

(52) U.S. Cl. ............... 725/27; 715/783; 715/810

(58) Field of Classification Search .......... 715/783, 715/810; 725/37, 39, 40, 43, 46, 47; 348/552, 348/561, 563, 564
See application file for complete search history.

(56) References Cited

U.S. PATENT DOCUMENTS

| | | | |
|---|---|---|---|
| 6,056,195 A * | 5/2000 | Spain | 235/432 |
| 6,067,400 A * | 5/2000 | Saeki et al. | 386/95 |
| 6,433,881 B1 | 8/2002 | Lynch et al. | |
| 6,453,459 B1 * | 9/2002 | Brodersen et al. | 717/100 |
| 6,456,305 B1 * | 9/2002 | Qureshi et al. | 715/800 |
| 6,961,512 B1 * | 11/2005 | Cho | 386/95 |
| 7,454,515 B2 * | 11/2008 | Lamkin et al. | 709/232 |
| 2003/0025732 A1 | 2/2003 | Prichard | |
| 2003/0035003 A1 | 2/2003 | Marcos et al. | |
| 2003/0188312 A1 * | 10/2003 | Bae et al. | 725/55 |
| 2003/0198463 A1 * | 10/2003 | Temple et al. | 386/125 |
| 2004/0179810 A1 * | 9/2004 | Haussmann et al. | 386/46 |
| 2004/0197087 A1 * | 10/2004 | Kim | 386/96 |
| 2005/0039207 A1 * | 2/2005 | Park et al. | 725/40 |

FOREIGN PATENT DOCUMENTS

| | | |
|---|---|---|
| DE | 19624679 | 8/1998 |
| EP | 0944254 | 9/1999 |
| GB | 2354862 | 4/2001 |
| WO | WO 02/33541 | 4/2002 |

OTHER PUBLICATIONS

"Review Function for Off-Line Menu Generator Tool", IBM Technical Disclosure Bulletin, Jul. 1987.
"Interpreted MOTIF Menu Generation Text Control Files", IBM Technical Disclosure Bulletin, Apr. 1994.
Sonic DVDFusion, Feb. 2001, www.mediarte.org/download/software/infopdfs/dvdfusion/windows/fusionwin_datasheet.pdf.
Ulead DVD Workshop 2, Jan. 2004, www.ulead.com/aboutulead/pressproducts/dws/dws2_rg.pdf.

* cited by examiner

*Primary Examiner* — Brian Pendleton
*Assistant Examiner* — Nnenna Ekpo
(74) *Attorney, Agent, or Firm* — Daniel W. Roberts; Law Offices of Daniel W. Roberts, LLC (57) ABSTRACT

Embodiments of the present invention relate to automatically creating localized menus for interactive media such as, for example, DVD-Video menus, via a menu component comprising references to an instance of menu background data, a menu text template defining text positions and sets of menu texts in different texts. The menu is then derived by processing the menu component. This enables localized menus to be produced more cost-effectively and more quickly than in non-automated prior art methods.

25 Claims, 5 Drawing Sheets

Figure 2

PRIOR ART

LOCALISED MENUS

FIELD OF THE INVENTION

The present invention relates to a system and method for creating localised menus.

BACKGROUND TO THE INVENTION

The DVD industry is a global industry. Throughout the Americas, Europe and Asia, there are now numerous countries in which DVD publishing is a thriving business. To assist the proliferation of the DVDs, it is advantageous to provide discs in local languages relevant to particular territories.

In the days of VHS video, the production and distribution of localised versions of a feature film and other video content was costly, since many different language versions of each title would be required. In recognition of this problem, DVD-Video was designed at the outset to enable more cost-effective production and distribution of titles for multiple territories. The DVD-Video specification provides the following in an attempt to address the above issue:

1. Up to eight multichannel audio tracks can be included on a DVD-Video disc, enabling dubbed audio in up to eight different languages;
2. Up to 32 sub-picture streams can be incorporated, allowing subtitles to be delivered on a single disc in up to 32 different languages;
3. Region coding enables publishers and distributors to control the deployment of products by territory.

These features mean that publishers are able to distribute titles that can be enjoyed in many local languages without having to produce a completely new product for each country. It is not unusual for blockbuster feature films to be available in between 20 and 30 different languages. Even low-budget and back catalogue titles are routinely produced in around 10 languages.

Localizing a Title for Multiple Territories Typically Entails the Following Activities:

1. Dubbing of the soundtrack using voice talent and synchronising the dubbed soundtrack with the original audio;
2. Translating the spoken language and providing subtitles using the DVD-Video sub-picture capability;
3. Producing a version of each menu in the target language;
4. Authoring the menu system required for each language.

The cost of items 1 and 2 is predominantly determined by the cost of labour to translate and, in the case of the soundtrack, to record the voiceover the local language. These are both inherently manual processes offering limited opportunity to streamline through automated processes. Items 3 and 4, representing a significant production cost, are currently undertaken using predominantly manual processes. Therefore, their cost is also closely related to labour costs.

Figure 1:
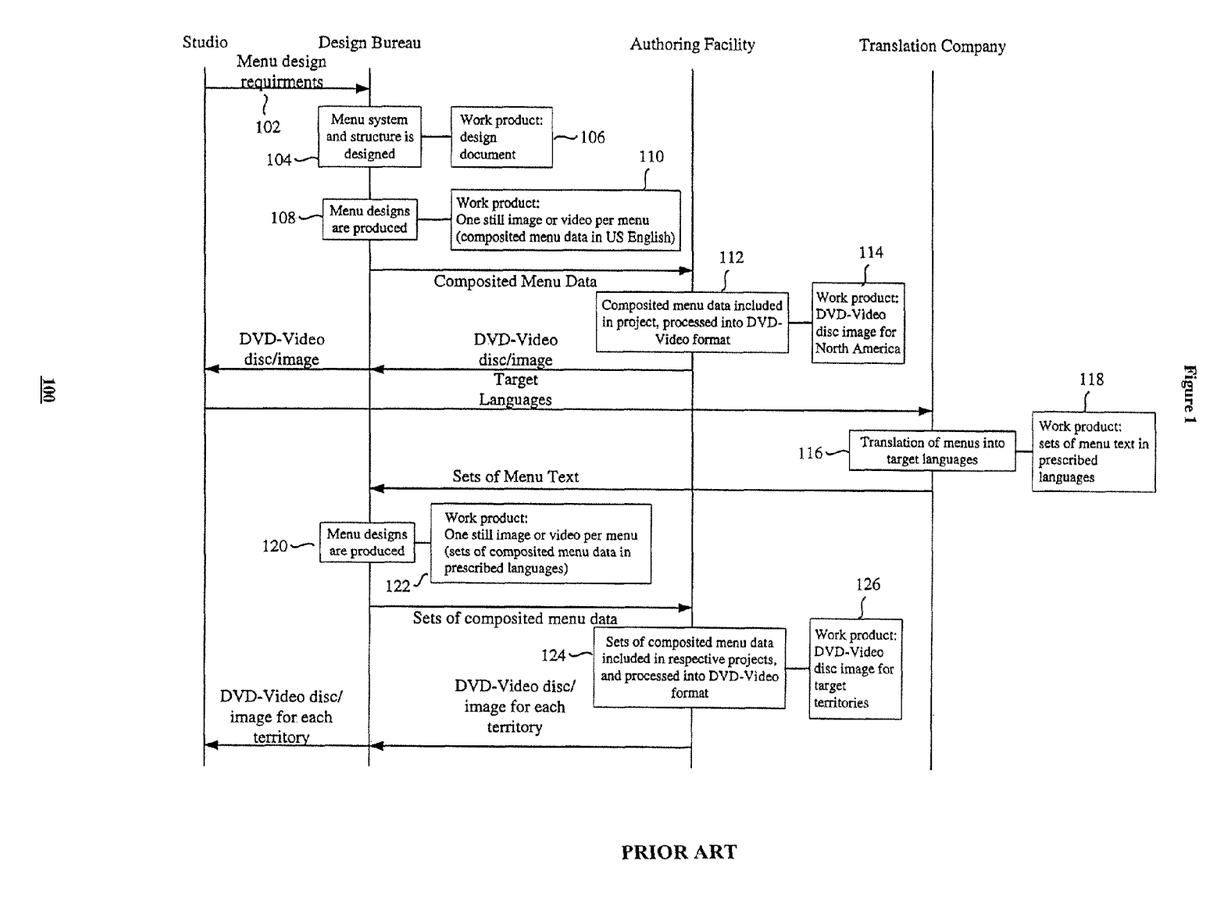
FIG. 1 illustrates the menu design process according to the prior art.

Although the precise process employed for localisation of titles varies from studio to studio, FIG. 1 shows a typical localisation process 100 in North America. The studio forwards a specification of its design requirements 102 to a design bureau. The design bureau analyses the menu design requirements to design the menu system and structure at process 104. The work product 106 produced by the menu system and design process 104 is a design document. The design document 106 is used to create, in menu design process 108, composited menu background data and menu text 110.

The composited menu data 110 is sent to an authoring facility. The authoring facility includes the composited menu data 110 into a current project and the resulting project is processed to convert the elements of that project into the DVD-Video format, which complies with one of the DVD specifications relevant to the DVD industry. The processing undertaking by the authoring facility is carried out at process 112. The result of process 112 is a work product in the form of a DVD-Video disc image 114 for North America.

The DVD-disc image for North America is forwarded by the authoring facility to the design bureau, which, in turn, forwards the DVD-video disc image or media containing such an image to the studio for approval. Once the studio has approved the disc or, in particular, the menu system and structure, the studio instructs the design bureau to create menu systems and structures for a number of target languages.

The studio forwards to a translation company an indication of the menu text needing translating as well as an indication of the target languages into which the menu text should be translated. At process 116 the translation company translates the text of the menu into the target languages. The work product 118 of the translation process 116 is a set of menu text items in prescribed languages.

The set of menu text items is forwarded from the translation company to the design bureau. The design bureau, at process 120, creates a menu system and structure for each of the target languages using the sets of menu texts in the respective languages of the target languages. The work product of the process 120 is a number of sets 122 of composited menu data comprising respective background stills or video loops together with respective menu text, in the prescribed target languages, as well as associated sub-picture and menu button information.

The sets of composited menu data are forwarded to the authoring facility. The authoring facility, at process 124, uses the sets of composited menu data to create a DVD-Video image or disc 126 for each a number of target territories according to the target languages.

The DVD-Video disc images for each of the target territories are forwarded by the authoring facility to the studio for approval.

In the above overall process 100, it can be appreciated that creating multiple language versions of the menus involves repeatedly performing the steps of composting of menu text onto the background and authoring the DVD-Video disc images using one or more language sets of the menus. Both of these steps are very labour-intensive and costly. Furthermore, the above overall process 100 can typically take several weeks to complete. It will be appreciated that such a duration for completion and the associated labour costs are undesirable.

Figure 2:
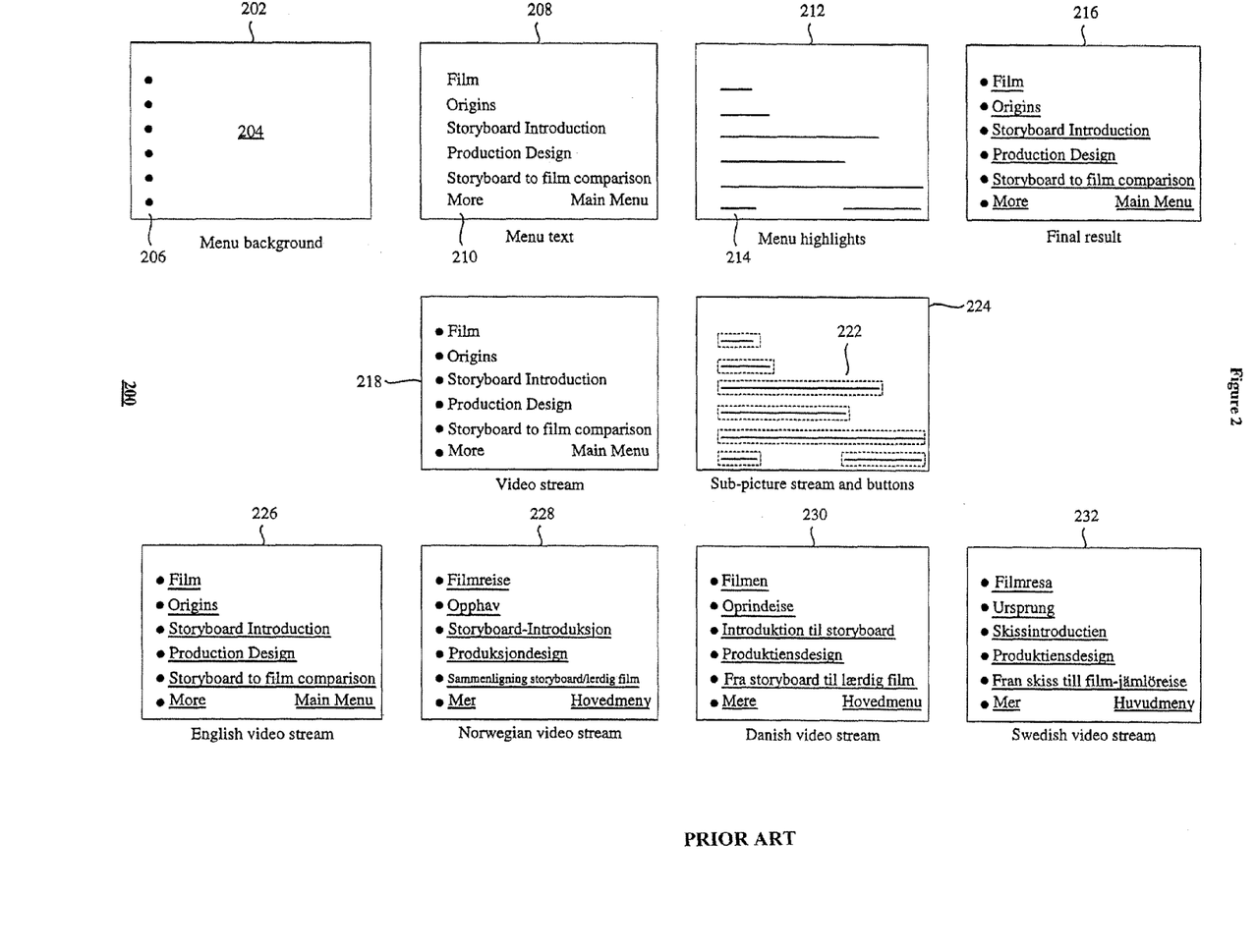
FIG. 2 depicts work products of the menu design process according to the prior art.

Referring to FIG. 2 there is shown various schematic representations 200 of the work products described above in FIG. 1.

The representations 200 of the work products produced in FIG. 1 comprise menu background data 202 in the form of either a still image or video 204 that, ultimately, will be arranged to loop together with a number of graphical elements 206. It will be appreciated, for the sake of simplicity, that the still image or video 204 is not shown in great detail.

A set of menu text items 208 is schematically illustrated. The sets of menu text items 208 comprise a plurality of words 210 intended to be placed adjacent to the graphical elements 206. It can be appreciated that the words include "Film", "Origins", "Storyboard Introduction", "Production Design", "Storyboard to Film Comparison", "More" and "Main Menu".

A set of highlight data 212 comprising a number of graphical highlight elements 214 is also created. The graphical highlight elements 214 are used to selectively highlight corresponding words of the plurality of words 210. It can be appreciated that the size, that is, the length in the embodiment illustrated, of the graphical highlight elements has been arranged to match the length of the corresponding words.

It can be appreciated that a complete set 216 of the menu background data, set of menu text items and menu of graphical highlight elements is illustrated.

The menu background data and the set of menu text items are used to produce the video stream 218 comprising composited menu background data and menu text. The graphical highlight elements 214, in conjunction with selectable buttons 222, are used to create a sub-picture stream 224 suitable for the selectively revealing the graphical highlight elements 214 in response to corresponding events.

It can be appreciated that the compositing process has been undertaken a number of times to produce data sets 226, 228, 230 and 232. These data sets can be used to reduce corresponding video streams in prescribed target languages. It can be appreciated that FIG. 2 illustrates English, Norwegian, Danish and Swedish potential video streams.

It will be appreciated from the above that the translation of the English-language set of menu text items into Norwegian, Danish and Swedish will impact on the size, that is, length, of the text forming the sets of menu text corresponding to the Norwegian, Danish and Swedish languages. This, in turn, has an impact on the size, that is, length in the illustrated embodiments, of any corresponding graphical highlight elements, which, also, in turn, has an impact on the dimensions of the menu buttons 222 that are used to selectively reveal the corresponding graphical highlight elements 214. Therefore, it can be appreciated that creating localised menus, that is, menus in the various target languages, is significantly more complex than merely translating a set of menu text items for a menu in one language into corresponding sets of menu texts in prescribed languages.

In the conventional approach to DVD title development and localisation, all of the video streams, sub-picture streams and highlight regions are created and configured manually. For each territory disc (where typically each disc will contain several language versions of the menus), the version must be authored multiple times since the DVD-video structure created during the authoring process cannot easily be reused. Since each language edition may incorporate many menus, localising menu systems involves considerable time and cost.

It is an object of embodiments of the present invention to at least mitigate some of the problems of the prior art.

SUMMARY OF INVENTION

Accordingly, a first aspect of embodiments of the present invention provides a method of creating composited audiovisual assets. Preferred embodiments provide a menu compositing method for producing a number of menu audiovisual assets in respective languages; the method comprising the steps of: establishing or creating a menu component representing the plurality of menu audiovisual assets, the menu component comprising references to an instance of menu background data (raw content object), a menu text template defining a number of text positions and layout information, and a number of sets of menu text in the respective languages (raw content objects); processing the menu component; the processing comprising creating one or more menu audiovisual assets by compositing the menu background data and the menu text of a selected set of menu text items, the menu text being positioned and formatted according to the text positions and formats defined by the menu text template.

Advantageously, embodiments of the present invention enable the creation of sophisticated interactive content for playback on media players such as, for example, standard hardware and software DVD players. Furthermore, it can be appreciated that defining a high-level abstraction of components such as, for example, the menu component, allows the repetitive, time-consuming error-prone aspects of compositing and authoring menu systems in many prescribed languages to be automated by computer software.

A second aspect of embodiments of the present invention provides an apparatus for creating composited audiovisual assets.

The third aspect of embodiments of the present invention provides a computer program for creating composited audiovisual assets and computer readable storage storing such a computer program.

In preferred embodiments, the composited audiovisual assets are processed to produce DVD data, that is, audiovisual digital content, that complies with one of the DVD-Video specifications. It will be appreciated that DVD-Video data, DVD-Video image and DVD-Video image data are embodiments of DVD data.

BRIEF DESCRIPTION OF THE DRAWINGS

Embodiments of the present invention will now be described, by way of example only, with reference to the accompanying drawings in which.

DETAIL DESCRIPTION OF PREFERRED EMBODIMENTS

Figure 3:
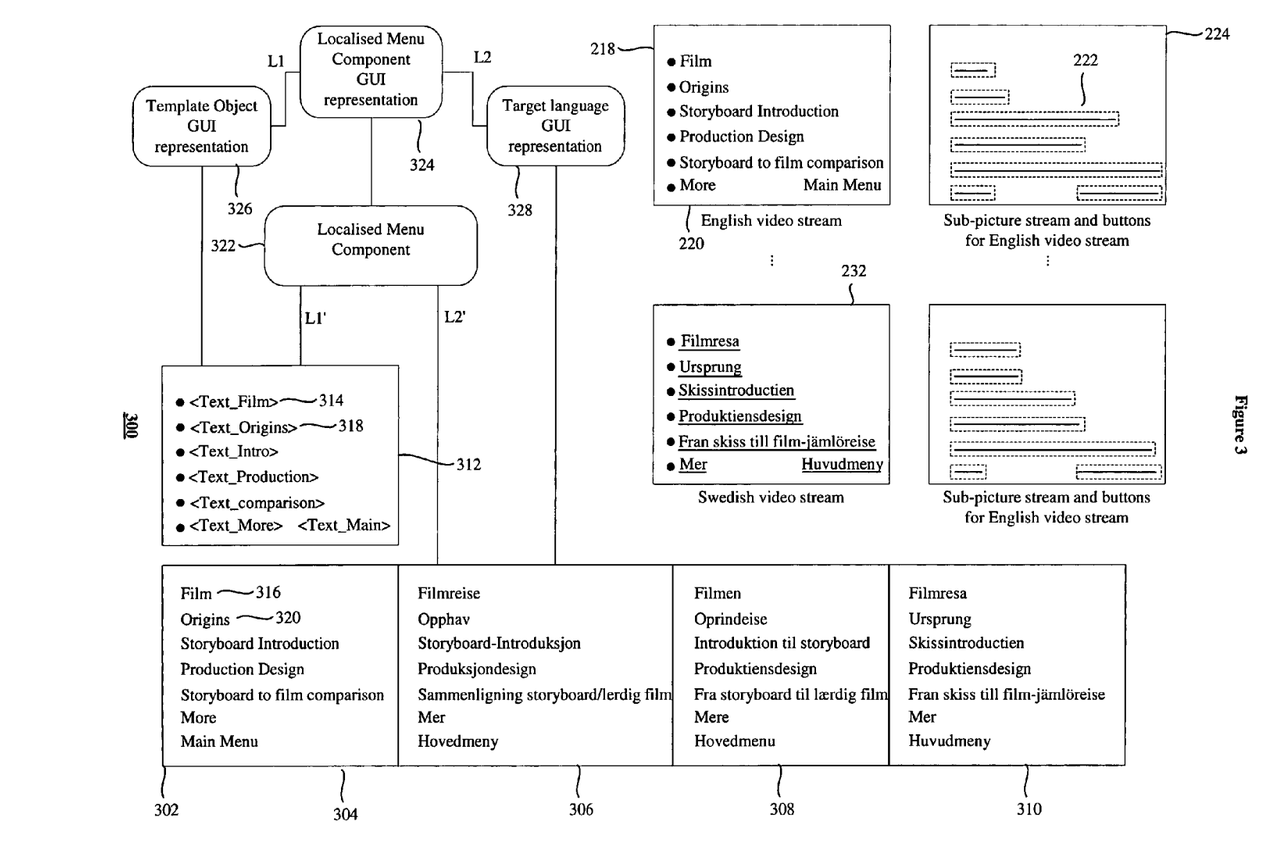
FIG. 3 shows schematically production of audiovisual assets according to an embodiment of the present invention.

Referring to FIG. 3 there is shown a collection 300 of the raw objects, processing components, representations of the raw objects in processing components and the audiovisual assets produced by the former. The raw objects comprise, in preferred embodiments, a spreadsheet 302 containing a number of sets of menu text 304, 306, 308 and 310. Each of the sets of menu text 304, 306, 308 and 310 comprises a plurality of words, all in a prescribed language for that set, intended to form of the menu text of corresponding menus.

A text template 312 is used to provide locations or positions and format data for text extracted from the sets of menu text 304, 306, 308 and 310. The text template 312 is populated using the text items in corresponding or prescribed positions within the template. For example, the text items position defined by "<text_film>" 314 will be populated with the text "Film" 316 from the first set of menu text items 304 when processing that set of menu text items and the text items contained within it. The next text item position, "<Text_Origins>" 318, will be populated using the second text item 320, which corresponds to the text "Origins".

The text template 312 and the spreadsheet 302 are used as inputs to a localised menu component or object 322. The localised menu component 322 can be represented graphically by a local menu component GUI representation 324. In preferred embodiments, the localised menu component 322 comprises an invocable method, which produces the localised menu component GUI representation 324. The text template 312 can also be represented graphically, in which case the user interface provides a corresponding template object GUI representation 326. Also, the spreadsheet 302 has a corresponding "target language GUI representation" 328.

The text template 312 and the spreadsheet 302 are used by the localised menu component 322 as inputs in response to creating an association between the localised menu component GUI representation 324, the template object GUI representation 326 and the target language GUI representation 328. In preferred embodiments, the association is created and represented by forming links between the localised menu component GUI representation 324, the template object GUI representation 326 and the target language GUI representation 328. It can be appreciated from FIG. 3 that there are two such links, L1 and L2, between the three representations 324, 326 and 328.

The localised menu component comprises a number of further invocable methods which, in addition to the methods for matching text items with text fields, analyse the length of text in any of the fields of the text template once populated with respective text items extracted from a given set of menu text items to calculate or scale, that is, dimension, the graphical highlight elements intended to be associated with the menu currently under construction. Once the sub-picture has been created, that is, once a complete set of graphical highlight elements for a current menu has been established, a further invocable method of the localised menu component 322 is arranged to construct a number of buttons, each associated with respective graphical highlight elements of the sub-picture, to allow the graphical highlight elements to be selectively displayed in response to corresponding events.

The localised menu component 322 is arranged to process each of the sets of menu text 304 to 310 in turn to produce respective video streams and sub-picture streams, which can be used in creating DVD-Video data.

Figure 4:
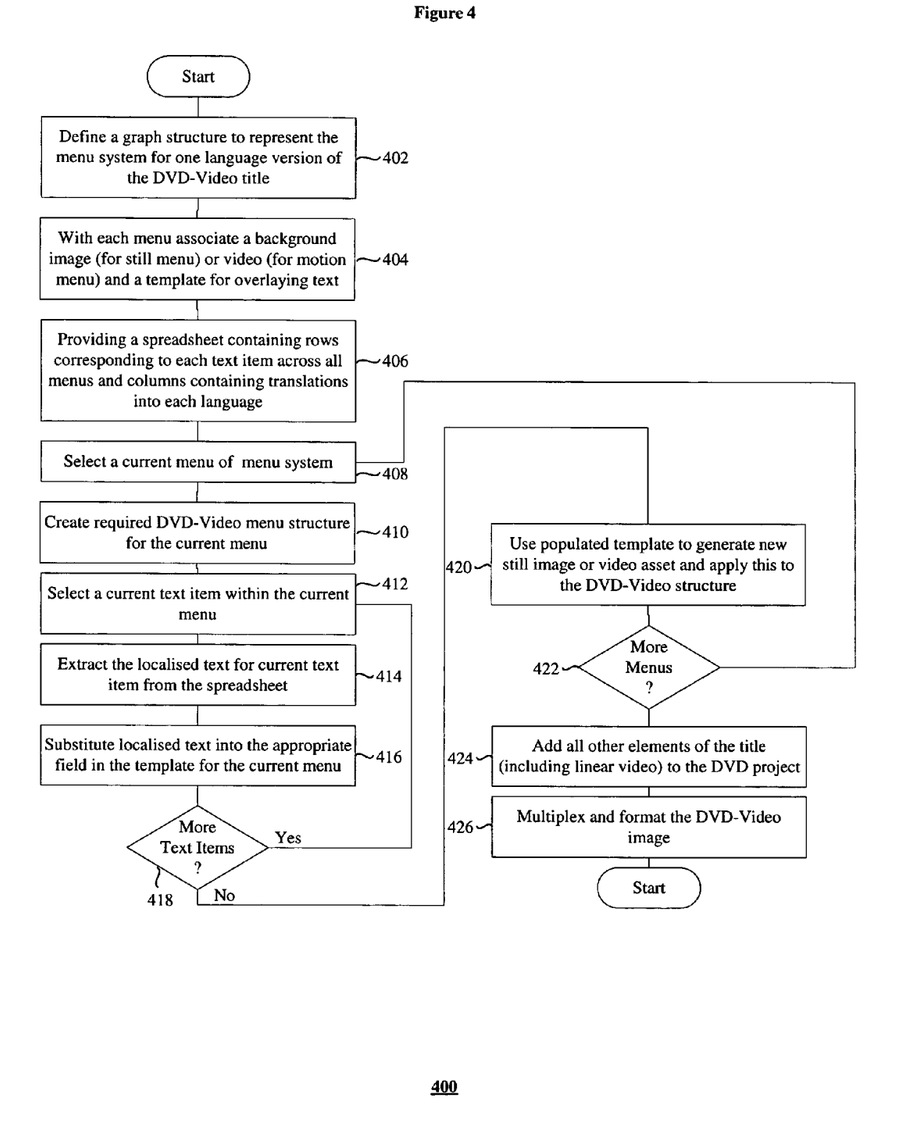
FIG. 4 illustrates a flowchart for producing audiovisual assets according to an embodiment of the present invention.

FIG. 4 shows a flowchart 400 of the processing performed by embodiments of the present invention in creating multiple menus in various prescribed languages. It will be appreciated that the sets of video streams and sub-picture data represent embodiments of audiovisual assets to be used in producing DVD-Video data.

At step 402, a graphical user interface (not shown) is used to define a graph structure to represent the menu system for the DVD-Video title. In preferred embodiments, the graph structure is defined by creating links between graphical representations of menu items and corresponding raw objects or audiovisual assets. The links define the legitimate traversals of the menu system.

A background image, for still menus, or a background video, for motion menus, is associated with each menu within the menu system together with a text template defining how the various text items of the menu should be positioned at step 404.

At step 406, a spreadsheet comprising rows corresponding to each text item for all menus within the menu system is provided. The spreadsheet contains, arranged by column, multiple instances of the text items for all menus within the menu system. Each column contains menu text in a prescribed language. In effect, a column of menu text items represents an embodiment of one, or at least a portion of one, of the sets of menu text items. In the embodiment illustrated in FIG. 3, it can be appreciated that the spreadsheet 302 comprises four columns of menu text items in the English, Norwegian, Danish and Swedish languages.

The current menu of the menu system defined at step 402 is selected at step 408 for processing. The DVD-menu structure data is created at step 410 for the currently selected menu and at this stage the video stream associated with such a DVD menu structure data is omitted. At step 412, the current text items of the menu text template is selected for population. The corresponding localised text for the currently selected text item is extracted from the spreadsheet at step 414. The extracted localised text is used to populate the menu text template with the current text item at step 416.

A determination is made, at step 418, as to whether or not the current menu text template corresponding to the current menu is fully populated. In preferred embodiments, step 418 is realised by determining whether or not all menu text items of the current set of menu text items have been processed. In effect, a determination is made as to whether or not a current set of menu text items comprises further menu text items. If the determination at step 418 is positive, processing resumes from step 412 where the next menu text item is selected for inclusion in the menu text template. However, if the determination at step 418 is negative, processing resumes from step 420 since all of the menu text items in a current set of menu text items must have been processed and incorporated into a corresponding menu text template.

The fully populated menu text template is used to generate a new still image or video asset, that is, a video stream, for presenting the menu using the menu text items just processed. The generated video stream is inserted as a new asset in the DVD-Video structure as the corresponding video stream for the menu structure data defined at step 410. It will be appreciated that, in preferred embodiments, using the fully populated menu text template comprises creating the graphical highlight elements and corresponding buttons and producing the sub-picture data used to selectively reveal the graphical highlight elements. It should be noted that embodiments of the present invention could be realised in which the generated video stream is arranged to be compliant with the appropriate DVD-Video specification. Alternatively, the generated video stream can be processed or formatted so that is complies with that specification prior to insertion into the DVD-Video structure as is described below in step 426.

Once the audiovisual assets for presenting the menu derived from the current set of menu text items and corresponding menu text template have been created, a determination is made at step 422 as to whether or not the graph structure of the menu system defined at step 402 comprises further menus that have yet to be processed or created. If the determination at step 422 is positive, the next menu within the menu system is selected, at step 408, to be the current menu. Thereafter, processing continues from step 410 as described above. However, if the determination at step 422 is negative, processing continues from step 424 where other elements of the current DVD project are created. At step 426, all of the marshalled or created audiovisual assets for a DVD project are multiplexed and formatted according to an applicable DVD specification to create the DVD-Video image.

It will be appreciated that the steps shown in the flowchart 400 represent the steps used to create audiovisual assets and sub-picture data and button data for all menus of a defined menu structure corresponding to a single language. The processing steps shown in the flowchart 400 will need to be repeatedly applied for each prescribed language of the set of target languages for which corresponding menus are required.

It will be appreciated by those skilled in the art that the menu text template, in preferred embodiments, used to create or define any given menu is defined or produced using, for example, a multimedia development tool such as, for example, Macromedia Flash or Director or Adobe AfterEffects. Therefore, the template can be "intelligent" in the sense that it can position the text fields of the menu text template in a way that is dependent upon a variety of factors. The variety of factors can comprise, for example, the width and height of the text fields, the character spacing, left-to-right or right-to-left text orientation, and an associated font, size, colour and pattern.

It will be appreciated from the flow diagram 400 shown in FIG. 4 that it does not include an optional step of utilising the template for the production of sub-pictures, which define the graphical highlight elements for the menus. It will be appreciated that preferred embodiments define the sub-pictures such that they are dependent upon the size or dimensions of associated menu text items. For example, the DVD-Video menu might highlight text by changing the colour of the text, which would be achieved by incorporating coloured text in the sub-picture to be overlaid precisely on the text in the menu.

Alternatively, as indicated in the embodiments shown above, the graphical highlight elements may be realised in the form of underlining of the associated menu text items. In such an embodiment, the underlining is arranged to have a length that matches the length of an associated menu text item. It will be appreciated that the function of the menu text template is to composite the background image or motion menu and video with the text to create corresponding audiovisual assets which, when played, present the desired menu.

It will be appreciated from the above that, unlike the current process employed by studios to create localised discs, the embodiments of the present invention integrate the steps of menu production and authoring as well as performing these steps automatically. In doing so, significant labour costs are eliminated and the time taken to produce localised menus is dramatically reduced from the order of several weeks to less than an hour and, in some instances, to the order of several minutes. The testing of the localised text or menus is undertaken by (a) checking the translated text provided in the spreadsheet and (b) examining the final DVD-Video image to ensure that the menu text is laid out appropriately. Therefore, the process of inspection testing is greatly simplified which, in turn, affords additional savings of cost and time. If, during inspection, errors are found in the text of the menus, those errors can be addressed simply by editing the contents of the spreadsheet and regenerating the DVD-Video image. Since such regeneration is a fully automated process, negligible further labour costs are incurred during such iterations.

Figure 5:
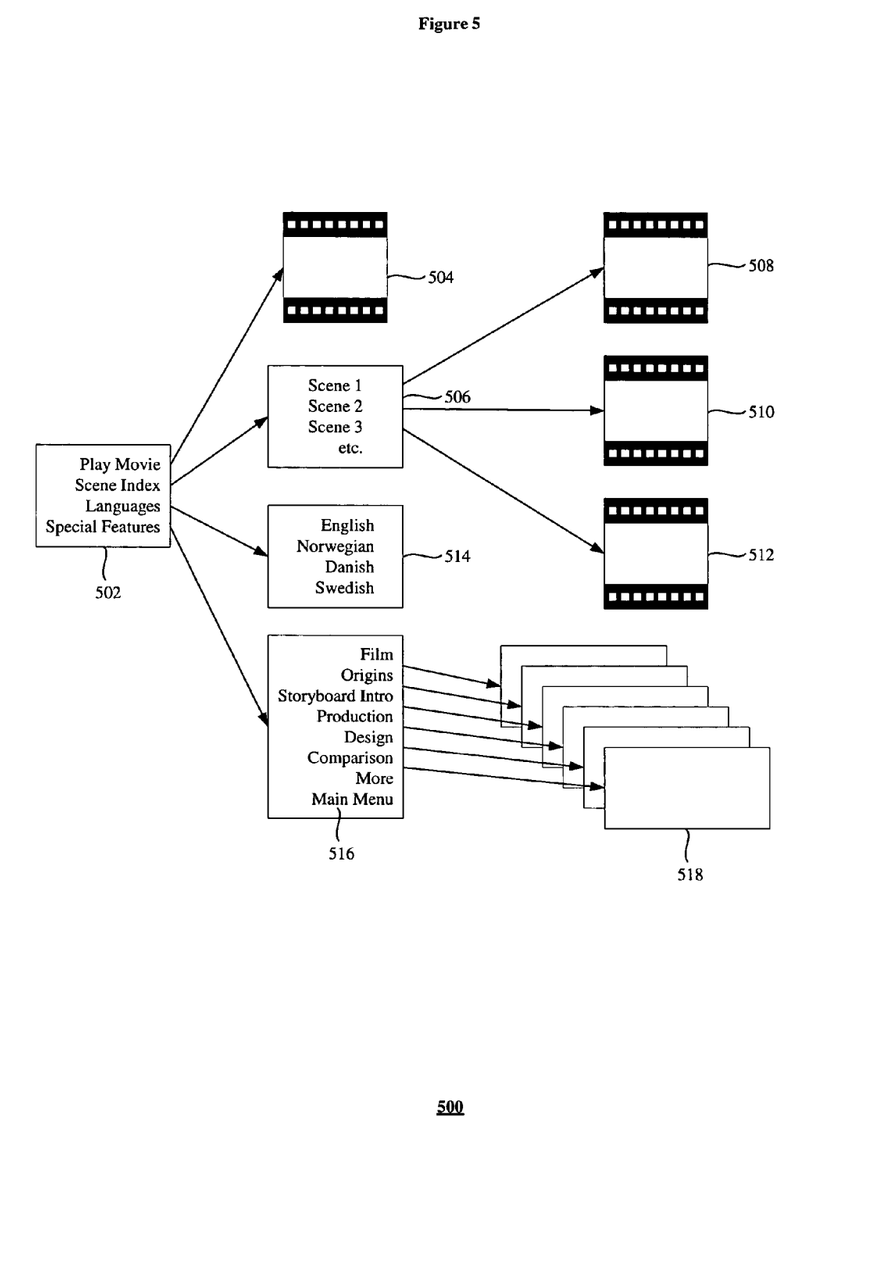
FIG. 5 depicts a schematic storyboard using audiovisual digital content created using embodiments of the present invention.

FIG. 5 shows schematically a schematic expression of a menu system 500, otherwise known as a graph structure as created at step 402, using the audiovisual assets representing localised menus produced according to the above embodiments.

The menu system 500 illustrated in FIG. 5 has been designed so that an initial menu 502 is presented after the usual legal notices etc have been presented. The initial menu 502 comprises, for the purposes of illustration only, four menu options; namely "Play Movie", "Scene Index", "Languages" and "Special Features".

Each of the menu options of the initial menu 502 leads to either a title feature film or further menus containing respective menu options. It can be appreciated that the first menu option, "Play Movie", of the initial menu 502 instigates the playing of a title feature film 504.

The second menu option, "Scene Index", of the initial menu 502 leads to a second menu 506 for selecting individual scenes of the complete title feature film 504. For the purposes of illustration only, the second menu option is illustrated as having three scene selection menu items, which cause the title feature film 504 to be played from respective scenes 508, 510 and 512.

The third menu option, "Languages", leads to a respective third menu 514 for setting the language to be used when the playing the disc.

The fourth menu option, "Special Features", of the initial menu 502 leads to a respective fourth menu 516 for selecting various additional or bonus features present on the disc. It will be appreciated that the fourth menu 516 corresponds to the English language version of the menus described above. It will also be appreciated that the language in which the fourth menu 516 is presented can be controlled using the selections available in the third menu 514. Each of the menu items of the fourth menu 516 leads to respective audiovisual content shown collectively as 518.

It will be appreciated that the audiovisual assets generated by the embodiments of the present invention can be accessed and used within an automated authoring facility or system in substantially the same manner as any other audiovisual assets can be processed by such a facility or system.

It should be noted that, under certain circumstances, the menu text template might not perform as intended. For example, if the translation of certain menu text into any particular language results in text that is considerably larger on-screen than anticipated when the template was designed, this will produce anomalous or undesirable menus in the finished audiovisual assets representing those menus. Therefore, preferred embodiments provide a manual override to allow certain menu items to be generated manually and substituted in place of the automatically generated items. In preferred embodiments, such a manual override can be integrated within or form part of the spreadsheet 302. Each menu item in any given set of menu text items can have an associated manual override field which can be toggled or set according to whether or not a manual override should be performed in relation to a respective menu text item. Therefore, when the localised menus component, in step 414, extracts the text corresponding to the current field of the menu text template from the spreadsheet 302, a test is performed prior to that extraction to determine whether or not a manual override is in effect for that menu text item. If the determination is that a manual override is not in effect for that menu text item, processing continues as normal. However, if it is determined that a manual override is effective for that menu text item, alternative text can be input via a user interface (not shown). Alternatively, alternative text can be included in the spreadsheet 302 for use in cases where a manual override is effective.

Although the above embodiments have been described with respect to presenting the menu text in the form of a spreadsheet, embodiments are not limited to such an arrangement. Embodiments can be realised that present the menu text in some other form such as, for example, in the form of an XML file, which describes the data in terms that match or correspond to the fields of the menu text template.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A non-transitory machine readable medium on which is stored a computer program for an automated method of authoring a number of interactive menu audiovisual assets in respective languages, the computer program comprising instructions which when executed by a computer system performs the method comprising:
    establishing or creating a menu component representing a plurality of interactive menu audiovisual assets, the menu component comprising references to an instance of menu background data, a menu text template defining a number of text positions and a number of sets of menu text in the respective languages; and
    the computer, as instructed by the computer program, iteratively compositing for each of the plurality of languages the menu background data and the menu text for each of the plurality of languages, the menu text being positioned according to the text positions defined by the menu text template to author the plurality of interactive menu audiovisual assets for each of the plurality of languages, the interactive menu audiovisual assets structured and arranged as executable code for a playback device, the executable code disposed upon a non-transitory storage medium as an audiovisual product.

2. The non-transitory machine readable medium as claimed in claim 1, wherein processing comprises:
    populating the menu template with menu text of the selected set of menu text items at respective positions defined by the text positions; and
    compositing the populated menu template and the menu background data to author a respective menu audiovisual asset.

3. The non-transitory machine readable medium as claimed in claim 1 further comprising creating in each interaction for each languages menu text an associated graphical highlight element.

4. The non-transitory machine readable medium as claimed in claim 3 in which creating for each menu text item in the selected set of menu text items a respective graphical highlight element comprises dimensioning a current graphical highlight element according to the size of a current menu text item.

5. The non-transitory machine readable medium as claimed in claim 4 in which dimensioning the current graphical highlight element according to the size of the current text item comprises determining the length of the current menu text item and setting the length of the current graphical highlight element according to the determined length.

6. The non-transitory machine readable medium as claimed in claim 4 or 5 in which dimensioning comprises establishing at least one of a character font and spacing for the current menu text item and calculating the size of the current text item according to the at least one of the character font and spacing or determining the origin and writing direction of the characters of the current menu text item.

7. The non-transitory machine readable medium as claimed in claim 3 further comprising creating a sub-picture comprising a plurality of the respective graphical highlights positioned relative to the text positions defined by the menu template.

8. The non-transitory machine readable medium as claimed in claim 7 further comprising creating button data comprising a plurality of buttons, selectively actuable in response to respective events, the buttons being positioned relative to the plurality of respective graphical highlights of the subpicture.

9. The non-transitory machine readable medium as claimed in claim 1 wherein establishing or creating the menu component comprises associating a plurality of selectably acutable buttons with the menu component.

10. The non-transitory machine readable medium as claimed in claim 1 further comprising creating transition data to and from the one or more menu audiovisual assets.

11. A non-transitory machine readable medium on which is stored a computer program for an automated method of authoring a number of interactive menu audiovisual assets in respective languages, the computer program comprising instructions which when executed by a computer system performs the method comprising:
    establishing or creating a menu component representing a plurality of interactive menu audiovisual assets, the menu component comprising references to an instance of menu background data, a number of sets of menu text in a plurality of different languages, each text having an associated length, and a menu text template defining a number of text positions of dynamic adjustability to automatically accommodate varying lengths of the sets of menu text; and
    the computer, as instructed by the computer program, iteratively compositing for each of the plurality of languages the menu background data, the menu text and the menu text template, the menu text template dimensioning an associated graphical highlight element to each item of menu text to author the plurality of interactive menu audiovisual assets for each of the plurality of languages, the interactive menu audiovisual assets structured and arranged as executable code upon a non-transitory storage medium for a playback device.

12. A non-transitory machine readable medium on which is stored a computer program for an automated method of authoring a number of interactive menu audiovisual assets in respective languages, the computer program comprising instructions which when executed by a computer system performs the method comprising:
    establishing or defining a menu component representing the plurality of audiovisual assets, the menu component comprising references to an instance of interactive menu background data, an interactive menu text template defining a number of text positions and a number of sets of menu text in the respective languages;

the computer, as instructed by the computer program, expanding, for each of the sets of menu text, the menu component; the expanding comprising;

establishing a populated interactive menu template with each of the menu text of the sets of menu text selected in turn at respective positions defined by the text positions; and compositing the populated menu template and the interactive menu background data to author a respective interactive menu audiovisual asset of the number of audiovisual assets, the interactive menu audiovisual asset structured and arranged as executable code upon a non-transitory storage medium for a playback device.

13. The non-transitory machine readable medium as claimed in claim 1, 11, or 12 further comprising creating DVD data using the one or more menu audiovisual assets.

14. The non-transitory machine readable medium as claimed in claim 11, wherein the text template automatically adjusts the position of each menu text based on a text factor.

15. The non-transitory machine readable medium as claimed in claim 14, wherein the text factor is selected from the group consisting of width, height, character spacing, left to right orientation, right to left orientation, and combinations thereof.

16. The non-transitory machine readable medium as claimed in claim 1, further including a manual override to allow a menu items to be generated manually.

17. The non-transitory machine readable medium as claimed in claim 11, further including a manual override to allow a menu items to be generated manually.

18. The non-transitory machine readable medium as claimed in claim 12, further including a manual override to allow a menu items to be generated manually.

19. A system for automatically authoring a plurality of interactive menu audiovisual assets in a respective plurality of languages, comprising:

a database providing a plurality of sets of menu text in a plurality of languages;

a menu text template operable to define locations or positions and format text extracted from the database, a menu background element associated with each menu location; and a localized menu component in communication with the database and text template, the localized menu component operable to automatically create links between graphical representations of menu items in a plurality of languages and corresponding audiovisual assets, the links authored as interactive menu audiovisual assets by the automated iterative process of the localized menu component to;

retrieve an element of menu text from the database;

populate an associated menu text template location, the menu text template dimensioning an associated graphical highlight element to each item of menu text and associated menu background element.

20. The system of claim 19, wherein the text template automatically adjusts the position of each menu text based on a text factor.

21. The system of claim 19, wherein the text factor is selected from the group consisting of width, height, character spacing, left to right orientation, right to left orientation, and combinations thereof.

22. The system of claim 19, wherein the menu background data is a still image.

23. The system of claim 19, wherein the menu background data is a video data.

24. The system of claim 19, wherein the authored interactive menu audio assets are multiplexed and formatted according to an applicable DVD specification to create al least a part of a DVD-video image.

25. The system of claim 19, further including a manual override component to allow a menu item to be generated manually.

* * * * *